June 26, 1923.

A. BÉLANGER ET AL 1,460,275

CALIPERS

Filed Nov. 11, 1920

3 Sheets-Sheet 1

Inventors
Angus Bélanger
Fredrick P. Riches
By William C. Sinton
Attorneys

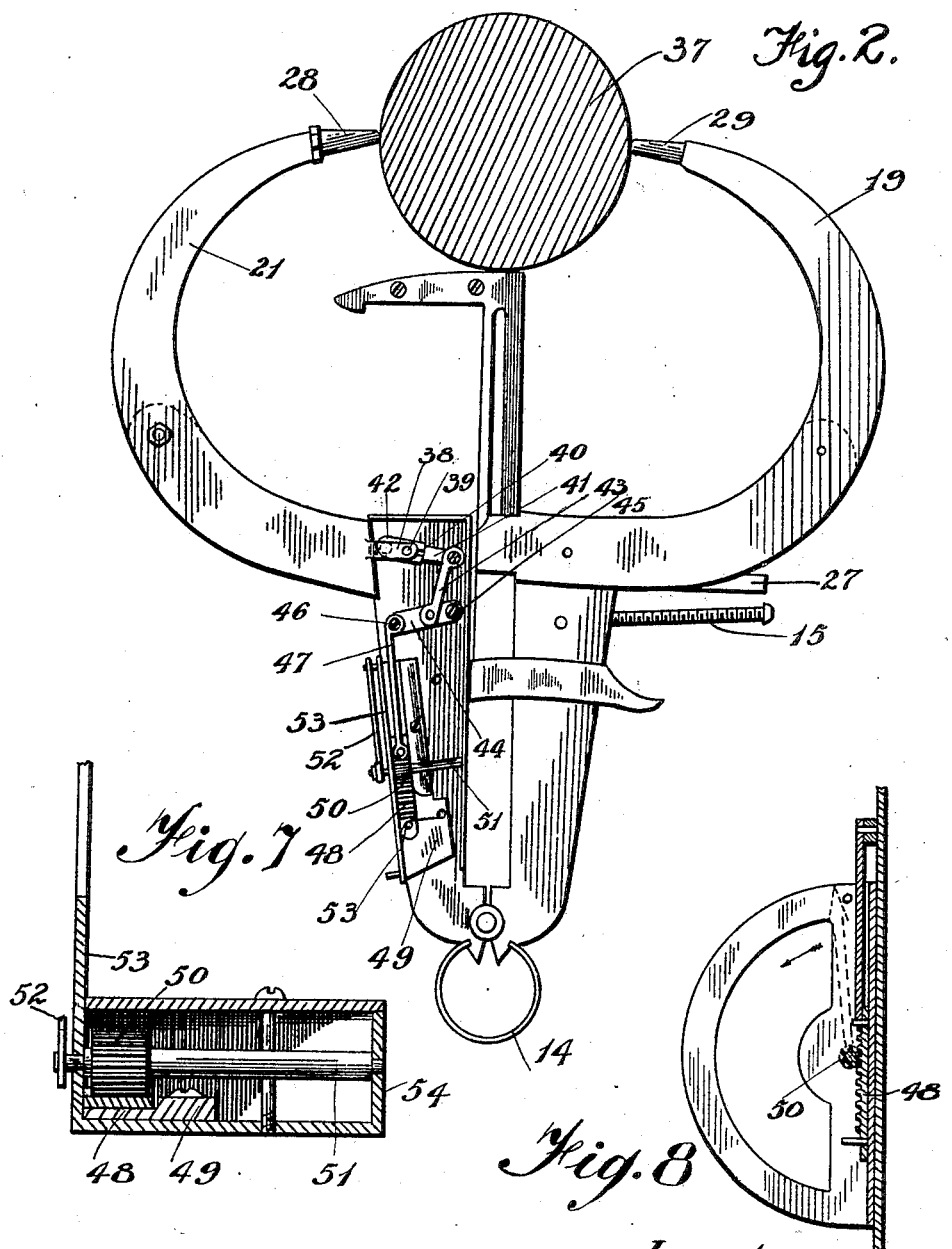

June 26, 1923.
A. BÉLANGER ET AL
1,460,275
CALIPERS
Filed Nov. 11, 1920    3 Sheets-Sheet 3
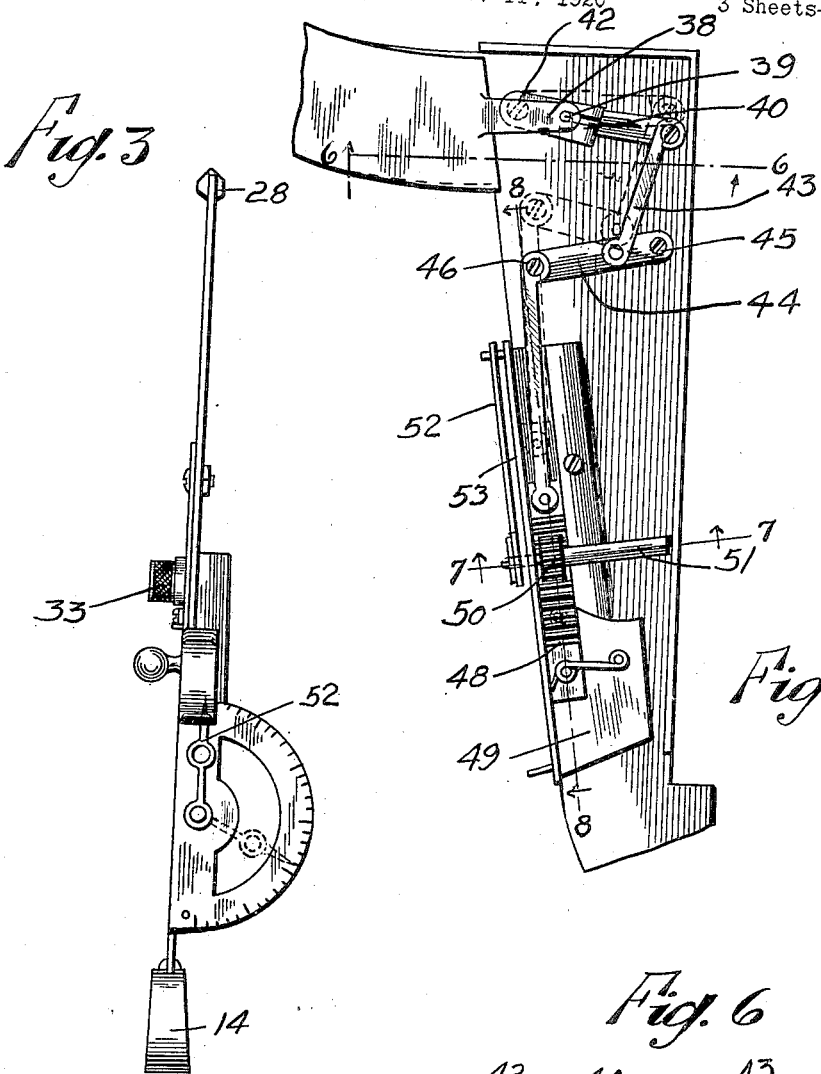
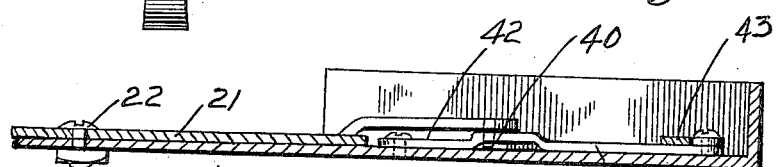
Inventors
Angus Bélanger
Fredrick P. Riches
By
William C. Linton
Attorney Patented June 26, 1923.

1,460,275

UNITED STATES PATENT OFFICE.

ANGUS BÉLANGER AND FREDERICK P. RICHES, OF MONTREAL, QUEBEC, CANADA.

CALIPERS.

Application filed November 11, 1920. Serial No. 423,387.

*To all whom it may concern:*

Be it known that we, ANGUS BÉLANGER and FREDERICK P. RICHES, both subjects of the King of Great Britain, residing at Montreal, Province of Quebec, Canada, have invented certain new and useful Improvements in Calipers; and we do hereby declare that the following is a full, clear, and exact description of the invention, such as will enable others skilled in the art to which it appertains to make and use the same.

The present invention relates to new and useful improvements in calipers so constructed that materials of various natures can be accurately gauged.

Another object of the invention is the provision of a pair of calipers having a diameter gauge which cooperates with the points in retaining the latter at exact diametrically opposite points upon the material to be gauged, thus increasing the accuracy and efficiency of the device.

Still another object of the invention is the provision of a pair of calipers having a gauge by means of which the distance between the points can be accurately set and a second gauge for gauging the diameter of the material to be worked upon in order that the accuracy and efficiency of the calipers will be increased.

A further object of the invention is the provision in a pair of calipers of a movable gauge point so constructed as to indicate in the thousandths of an inch the material to be worked upon.

A still further object of the invention is the provision of a pair of calipers, as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawings forming a part of the present invention, and in which:—

Figure 1:
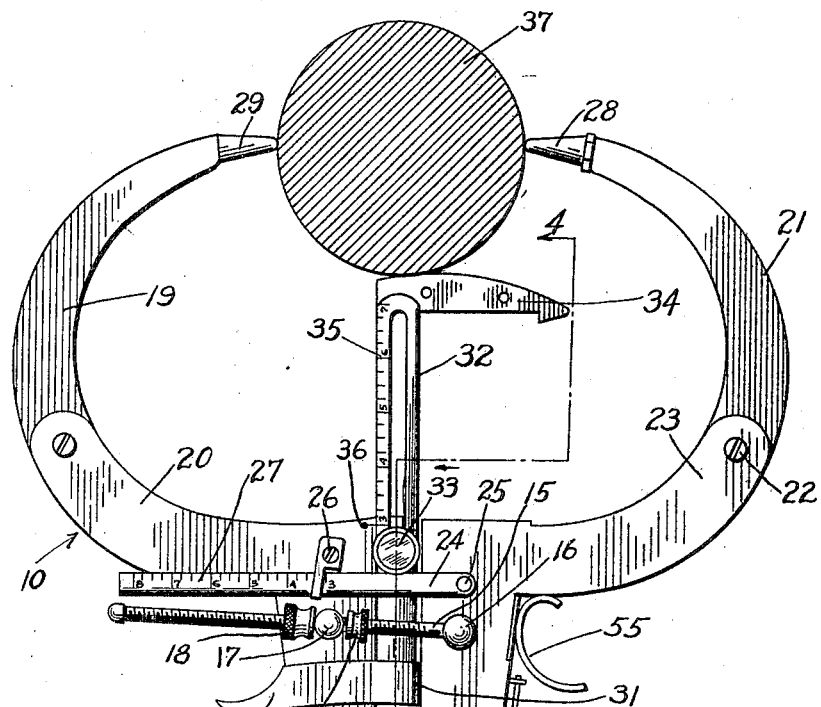
Figure 4:
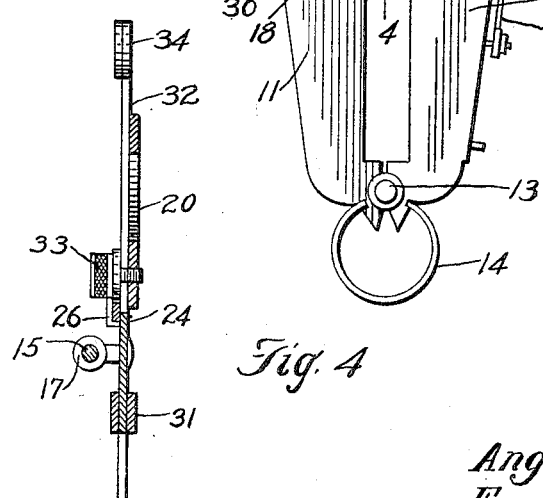

Figure 1 is a top plan view of the calipers;
Figure 2 is a bottom plan view thereof with the plate removed;
Figure 3 is an edge view;
Figure 4 is a longitudinal sectional view taken on the line 4—4 of Figure 1;
Figure 5 is an enlarged detail view showing the actuating mechanism for the movable caliper arm or point;
Figure 6 is an enlarged sectional view taken on the line 6—6 of Figure 5;
Figure 7 is a transverse sectional view on an enlarged scale taken on the line 7—7 of Figure 5; and
Figure 8 is a longitudinal sectional view on the line 8—8 of Figure 5.

Referring now to the accompanying drawings by corresponding characters of reference throughout the several views, the numeral 10 denotes in general my improved calipers which comprise a pair of plates 11 and 12 pivotally connected at their lower ends as at 13 and forced yieldingly outwardly at their opposite ends by a spring 14.

A threaded adjusting rod 15 is swivelled at 16 to the intermediate portion of the plate 12, while the opposite end thereof passes through a swivelled eye 17 carried on a corresponding point upon the plate 11.

Milled adjusting nuts 18 engage the threaded rod 15 upon opposite sides of the eye 17 and lock the said rod and plates 11 and 12 in their adjusted positions.

A stationary frame 19 is secured to the end 20 of the plate 12, while a pivoted arm 21 is pivotally connected at 22 to the outer terminal of the end 23 of the plate 11, for movement relative to each other.

A pivoted gauge 24 is attached at 25 to the arm 23 and passes through a guide 26 connected to the plate 20. This guide 26 likewise acts as a gauge to cooperate with the indication marks 27 upon the gauge 24. These indication marks are numerically numbered so that when said marks register with the indicator 26, the distance between the points 28 and 29 will indicate the thickness of the material to be worked on.

A suitable finger piece 30 is secured to the plate 11 and is provided at its inner end with a guide 31 through which a sliding gauge 32 passes. This gauge 32 may be locked in its various adjusted positions by a screw shown at 33. The upper end of the gauge 32 is provided with a segmental head 34 adapted to engage the side of the material to be worked on and cooperates with the points 28 and 29 in a manner to be later described.

The gauge 32 is provided with suitable indication marks 35 which cooperate with the indicating mark 36 on the plate 11 and this gauge may be so set that when the points 28 and 29 are arranged to indicate the thickness of the material to be worked on, the head 34 will engage the side of the material at half the distance between the inner terminals of the points 28 and 29, so that when the material rests against the head 34, the points 28 and 29 will engage diametrically opposite points upon the material which is shown at 37.

In order to provide for a finer adjustment which will gauge the material to be worked on in the thousandths of an inch, the arm 21 is pivotally connected to the segmental plate 23 as previously described and is provided at its inner end with a finger 38 having an inwardly directed point 39 which engages a slot 40 formed in a lever 41 which is pivotally connected at 42 to the plate 12. A link 43 connects the free end of the lever 41 to the intermediate portion of a lever 44 which is pivoted at 45 to the plate 12 at one end and at its opposite end as at 46 to a rod 47 which connects the latter with a sliding rack 48 mounted in a suitable guide plate 49 attached to the before described plate 12. The rack 48 engages with a pinion 50 and upon the movement of the rack caused by the movement of the arm 21 through the instrumentality of the before mentioned links and levers the pinion 50 will be rotated carrying with it the shaft 51 to which it is secured. The outer end of the shaft 51 has keyed thereto an indicator point 52 which cooperates with a segmental gauge 53 indicating in the thousandths of an inch the movement of the arm 21.

The rack and its operative connections may be sealed by a plate 54 which is provided with a finger grip shown at 55 by means of which and through the assistance of the finger grip 30 the calipers may be manipulated.

From the foregoing description taken in connection with the accompanying drawings, it will be manifest that a caliper is provided which will fulfil all of the necessary requirements of such a device, and it should be understood in this connection, that various minor changes in the specific details of construction can be resorted to within the scope of the appended claims without departing from the spirit or sacrificing any of the advantages of the invention.

Having thus fully described the invention, what we claim as new and desire to protect by Letters Patent is:—

1. In a pair of calipers, the combination of a pair of pivoted plates, a spring connecting said plates, a gauge cooperating with said plates to indicate the space between the swinging ends thereof, arms carried by said plates, one of said arms being pivotally mounted, points carried by the arms, and an indicator carried by one of the plates and actuated by the movement of said pivotally mounted arm for indicating fractions of an inch.

2. In a device of the character described, the combination of a pair of plates, arms secured thereto, one of said arms being pivotally connected, points carried by the arms, a pivoted gauge attached to one plate and cooperating with the opposite plate, a sliding gauge disposed between the plates and cooperating with the points, and an indicator actuated by the pivoted arm, substantially as and for the purposes set forth.

3. In a device of the character described, the combination of a pair of pivoted plates, arms connected to said plates, one of the arms being rigid and the other one movably connected to the plates, a pointer, a shaft carrying the pointer, a pinion carried by the shaft, a rack slidably engaging the pinion for rotating the shaft and actuating the pointer, and a link and lever connection between the pivoted arm and rack.

4. In a device of the character described, a pair of pivoted plates, a spring connecting the pivoted ends of said plates, arms secured to the opposite ends of the plates, one of said arms being fixed on and the other being pivotally mounted on its respective plate, finger grips carried by the plates, contact points carried by the arms, a slidable gauge carried by one of the plates and cooperating with said contact points, a gauge carried by the plates and cooperating therewith for indicating the diameter of work placed in contact with the slidable gauge and the contact points, and a gauge actuated by said pivotally mounted arm for indicating in fractions of an inch variations in the distance between said contact points.

In witness whereof we have hereunto set our hands.

FREDERICK P. RICHES.
ANGUS BÉLANGER.